Dec. 28, 1954  G. D. BECKER  2,698,194
FLUID AND DUST SEAL
Filed April 6, 1951

Inventor
George D. Becker
by Wayne B. Easton
Attorney

United States Patent Office 2,698,194
Patented Dec. 28, 1954

2,698,194

FLUID AND DUST SEAL

George D. Becker, Wauwatosa, Wis., assignor to Allis-Chalmers Manufacturing Company, Milwaukee, Wis.

Application April 6, 1951, Serial No. 219,670

1 Claim. (Cl. 286—5)

This invention relates generally to a fluid and dust seal for use between relatively movable members and specifically to a seal applicable for mounting between a stationary member and a gyratory member having a combined sliding, rotary, and eccentric movement. The principal object of this invention is to provide a new and improved seal of this type.

Heretofore seals disposed between a stationary member and a moving member having an erratic motion, were constructed in such manner and of such material that the fluid and dust tight engagement of the seal with the moving member was disturbed as a result of the seal being deformed when the moving member moved eccentrically relative to the stationary member. Hence it is an object of this invention to provide means whereby the eccentric motion of the moving member is not so imparted to the seal as to disturb the sealing engagement thereof with the moving member.

Another object of the invention is to provide means to eliminate relative eccentric displacement between the portion of the seal and the moving member portion engageable therewith.

A more specific object of this invention is to provide means for imparting the eccentric motion of the moving member only to the supporting portion of the seal and not to the portion of the seal engaging the moving member.

Other objects will appear hereinafter as the description of the invention proceeds.

The novel features of the invention and how the objects are attained will appear from the specification and the accompanying drawings forming a part of this application, and all these novel features are intended to be pointed out in the claim and in the drawing:

Figure 1:
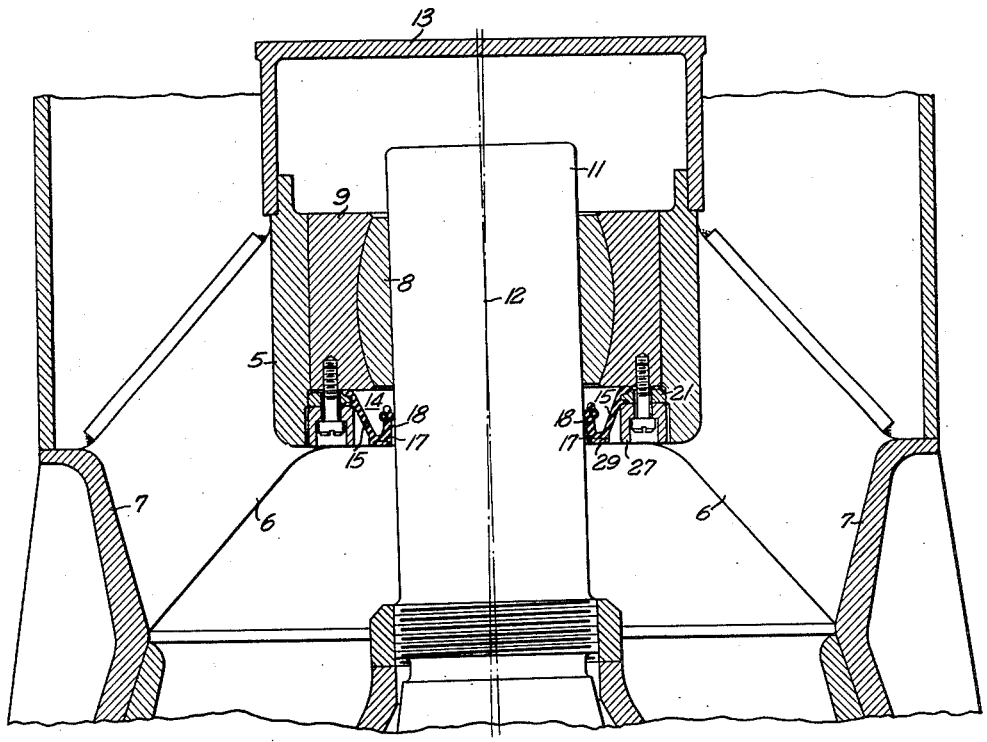
Fig. 1 is a section taken through the upper part of a gyratory crusher embodying the features of the invention.

In Fig. 1 a spider bearing housing or hollow stationary member 5 is supported by spider arms 6 extending radially upward from a frame 7 of a gyratory crusher. A bearing, such as shown, characterized by a ball element 8 and socket element 9, is carried in the bearing housing 5. The socket element 9 is rigidly secured in the stationary member 5, and for purposes of describing this invention may be considered as functionally integral therewith. An inner member such as shaft 11 is journaled in the ball element 8 and is eccentrically displaceable relative to the housing 5 about a fulcrum point 12 defined by the ball and socket bearing. A cap 13 may be secured to the housing 5 in any well known manner to prevent the material which is to be crushed from entering therein. Disposed between the stationary member 5 and the shaft 11 is a resilient fluid seal 14, hereinafter fully described, for preventing leakage of fluid or dust respectively out of or into the bearing housing 5.

The resilient fluid seal 14 which surrounds the shaft 11 is annularly shaped and comprises generally an intermediate portion 15 connected through a portion 17 to an axially extending portion 18. Each of the three portions may be combined into a single sealing element, as shown in Figs. 1 and 2, or the portions may constitute separate distinct elements fastened together to form the seal 14a, as shown in Fig. 3.

Figures 2, 3:
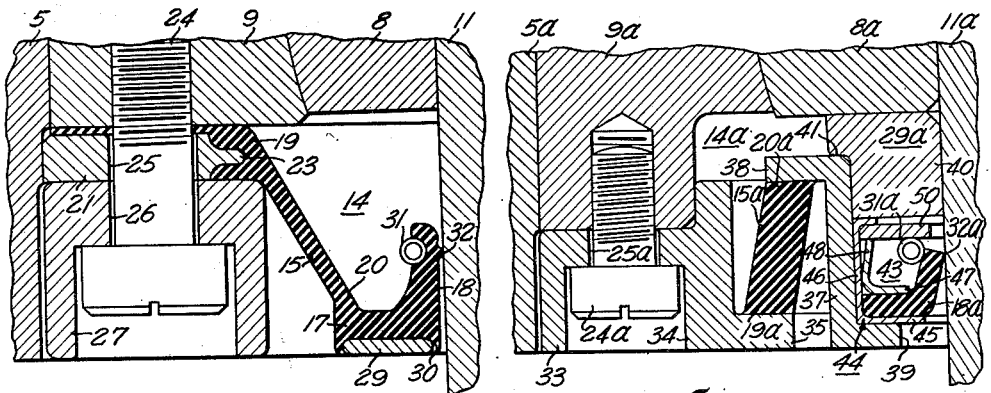
Fig. 2 is an enlarged section of a portion of crusher and the fluid and dust seal shown in Fig. 1.
Fig. 3 is an enlarged section showing another embodiment of the invention and in which reference characters with the suffix "a" indicate similar parts throughout the several views.

As shown in Fig. 2, the seal 14 comprises preferably a flexible frusto-conical structure, annular in shape, and having a transverse section which tapers inwardly toward the shaft 11 from a fixed base portion or anchoring portion 19 to the axially extending portion 18. The base portion 19 is provided with an annular groove for receiving into engagement an annular flange 23 of a washer ring 21. The base portion 19 of the seal 14 is secured to the housing 5 in nonrotatable relation by means of bolts 24, only one of which is shown in Fig. 2, which pass through respective holes 25, 26 in the washer ring 21 and retainer ring 27, and threaded into the socket element 9.

The portion 17 of the seal 14 extends inwardly toward the shaft 11. A reinforcing member 29 for the axially extending portion 18 is shown as a rigid annular ring embedded in the portion 18, surrounding the shaft 11 in concentric relationship therewith. This concentric relationship when the crusher is operating, is not disturbed to any appreciable extent by the material designated by reference character 30 of the axially extending portion 18 extending between the inner periphery of the washer 29 and the shaft 11. The portion 18 is of sufficient width and thickness to afford a good bonding surface for the ring 29.

The axially extending portion 18 which comprises a first part or sealing lip 32 in slidable engagement with the surface of the shaft 11 extends substantially parallel to the inner member or shaft 11. Since the eccentric displacement of the shaft 11 when the crusher is operating decreases progressively along points on the shaft approaching the fulcrum point 12, the axially extending portion 18 is here shown as extending from below the fulcrum point toward the fulcrum point, or in other words from the rigid member 29 toward that part of the shaft 11 having less eccentric displacement than the part of the shaft comprehended within the rigid member 29. In the present structure the axially extending portion 18 lies within the limits of longitudinal movement of the flexible support member 15. Spring means, such as a garter spring 31, are provided for biasing the annular sealing lip 32 of the portion 18 into fluid tight engagement with the shaft 11.

The portion 18 of the fluid seal 14 is so reinforced by the member 29 that as the shaft 11 gyrates about the fulcrum point 12, or is eccentrically displaced relative thereto, the portion 18 follows the motion of the shaft 11 without substantial flexure. Because of the concentric relationship of the rigid member 29 with the shaft 11 the motion of the shaft 11 is imparted to the rigid member 29 through the sealing lip 32. The displacement of the shaft 11 is entirely absorbed by the flexure of the intermediate portion 15, and not by the portion 18. The rigid member 19 thus prevents deformation of the axially extending portion 18 during movement of the shaft 11 and cooperates with the spring 31 to maintain the lip 32 in sealing engagement with the shaft 11 at all times. Since the shaft 11 may also rotate relative to the housing 5, which rotation may create stresses in the intermediate portion 15, the portion 15 is of sufficient circumferential stiffness to prevent twisting but still sufficiently resilient to flex with the eccentric motion of the shaft 11.

In the embodiment shown in Fig. 3, the seal comprises a base portion or securing ring 33 having a channeled portion 34, provided with annularly spaced holes 25a for receiving bolts 24a, only one of which is shown in Fig. 3, to secure the ring 33 to the stationary member 9a. To a flanged portion 35 of the seal is secured by any suitable means, as by bonding, one end 19a of a second resilient annular element 15a, shown as a frusto-conical structure which tapers inwardly toward the shaft 11a from the secured end 19a. The opposite or converging end 20a of the second resilient annular element 15a is secured to a portion of a rigid or nonflexible annular member 37. The rigid annular member or element 37 is concentrically disposed relative to the shaft 11a and provided at one end with a radially outwardly extending annular flange 38 and at the other end with an inwardly radially extending annular flange 39. A rigid annular portion 40 extends radially inwardly from the inner end of the outwardly extended flange 38, in closely fitting sliding engagement with the shaft 11a. A shoulder 41 may be provided on the portion 40 for support thereof by the annular member 37, which in turn is supported by the second resilient annular element 15a.

A first annular resilient sealing element 18a is carried on the rigid inwardly extending flange 39 of the annular member 37, by means of a clamp assembly 43. The clamp assembly 43 comprises a first ring, provided with a radially inwardly extending lower flange 45 and a cylindrical portion 46, the portions 45, 46 being snugly fitted, respectively, to the inner periphery of the annular member 37 and its inwardly extending flange 39. A base section of the first annular resilient element 18a is secured between the lower flange 45 and a radially extending portion 47 of a second ring 48. The second ring 48 is secured in position by a flat annular member 50 pressed between an upper edge of an inwardly tapered annular portion of the second ring 48 and a turned over edge of the first ring 44. A garter spring 31a is stretched about the lip portion 32a of the sealing member 18a to insure fluid tight sealing engagement thereof with the shaft 11a. The garter spring 31a is held in operative position against the lip portion 32a through the cooperation of the flat circular member 50.

In the second embodiment of the invention shown in Fig. 3, the portion 40 provides means operably interposed between the nonflexible annular member 37 and the shaft 11a for causing the member 37 to follow the eccentric movements of the shaft relative to the stationary housing 5a to maintain the first annular resilient element 18a in substantially concentric fluid tight engagement with the shaft 11a for all operable positions of the shaft relative to the housing 5a. Hence the second annular resilient element 15a absorbs all the relative movement by flexure without any flexure of the first annular resilient element 18a.

From the foregoing it will be apparent to those skilled in the art that the illustrated embodiments of the invention provide new and improved fluid and dust seals of the type disposed between a stationary member and a slidable, rotatable and gyratory inner member having an eccentric displacement, and accordingly accomplishes the objects of the invention. On the other hand, it will be obvious to those skilled in the art that the illustrated embodiment of the invention may be variously changed and modified, or features thereof singly or collectively, embodied in other combinations than those illustrated, without departing from the spirit of the invention, or sacrificing all of the advantages thereof, and that accordingly the disclosure herein is illustrative only, and the invention is not limited thereto.

It is claimed and desired to secure by Letters Patent:

In a device for sealing a shaft journaled in a machine housing to said housing, said shaft and said housing being movable relative to one another, said device having a nonflexible annular retainer ring radially spaced from and surrounding said shaft in nonrotatable relation to said housing, said retainer ring having a plurality of holes, and fastening means cooperating with said holes for detachably securing said retainer ring to said housing; an improved seal comprising: a nonflexible annular member adapted to be radially spaced from and to surround said shaft in nonrotatable relation to said housing, said member being spaced from said housing and having limited radial and axial movement relative thereto; a rigid annular disk adapted to be adjacent said retainer ring having a plurality of holes for cooperating with said fastening means for detachably securing said disk to said housing, said disk having further an inwardly extending flange; a resilient annular element bonded to said member, said element adapted to surround said shaft and interposable between said shaft and said housing in sealing engagement with said shaft, said resilient element having an outwardly extending flange portion, a shaft sealing portion, and an axially extending intermediate portion for flexibly connecting said flange portion to said shaft sealing portion, said shaft sealing portion having a first part presenting an annular lip surface disposable in a sealing and sliding engagement with said shaft and a second part interposed between said first part and said nonflexible annular member presenting a second annular surface facing said shaft, said second surface being adapted to be radially spaced from said shaft and in substantially parallel relation thereto, said outwardly extending flange portion having a first outwardly extending part and a second part adjacent said first part defining an annular recess in the outer periphery thereof, said recess mated in bonded relation with said flange of said disk, said outwardly extending part forming a gasket sealing means adapted to surround said fastening means between said disk and said housing for preventing the passage of foreign matter from one side of said gasket sealing means to the other; spring means encircling said shaft sealing portion of said resilient element for holding said lip surface of said sealing element in substantially concentric fluid tight sealing and sliding engagement with said shaft.

References Cited in the file of this patent

UNITED STATES PATENTS

| Number | Name | Date |
|---|---|---|
| 1,569,370 | Hill | Jan. 12, 1926 |
| 1,781,201 | Spreen | Nov. 11, 1930 |
| 2,145,928 | Heinze et al. | Feb. 7, 1939 |
| 2,185,450 | Wager | Jan. 2, 1940 |
| 2,358,536 | Reynolds | Sept. 19, 1944 |
| 2,437,900 | Winkeljohn | Mar. 16, 1948 |
| 2,482,029 | Reynolds | Sept. 13, 1949 |
| 2,574,062 | Reynolds | Nov. 6, 1951 |

FOREIGN PATENTS

| Number | Country | Date |
|---|---|---|
| 209,265 | Great Britain | of 1923 |